US010871799B2

(12) United States Patent
Yan et al.

(10) Patent No.: US 10,871,799 B2
(45) Date of Patent: Dec. 22, 2020

(54) VIDEO GLASSES (71) Applicant: SZ DJI TECHNOLOGY CO., LTD., Shenzhen (CN)

(72) Inventors: Shaojun Yan, Shenzhen (CN); Dengfeng Hu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/363,617

(22) Filed: Mar. 25, 2019

(65) Prior Publication Data
US 2019/0220057 A1 Jul. 18, 2019

Related U.S. Application Data (63) Continuation of application No. PCT/CN2016/100265, filed on Sep. 27, 2016.

(51) Int. Cl.
G02B 27/01 (2006.01)
G06F 1/16 (2006.01)

(52) U.S. Cl.
CPC ......... G06F 1/163 (2013.01); G02B 27/0176 (2013.01)

(58) Field of Classification Search
CPC ..... A61F 9/061; A61F 9/025; G02B 27/0179; A42B 3/222; A42B 3/223
See application file for complete search history.

(56) References Cited

U.S. PATENT DOCUMENTS 2,360,101 A * 10/1944 Bowers ...................... A61F 9/06
2/8.1
3,075,201 A * 1/1963 Lindblom ................. A61F 9/06
2/8.1
3,079,609 A * 3/1963 Hoffmaster .............. A42B 3/14
2/8.1
4,464,800 A * 8/1984 Edwards .................... A61F 9/06
2/451
5,337,419 A * 8/1994 Russell ....................... A61F 9/02
128/857
5,682,172 A * 10/1997 Travers .............. G02B 27/0176
345/8
5,767,820 A * 6/1998 Bassett ................ G02B 27/017
345/7
5,954,642 A 9/1999 Johnson et al.
6,150,998 A * 11/2000 Travers .............. G02B 27/0176
345/8

(Continued)

FOREIGN PATENT DOCUMENTS

CN 201114419 Y 9/2008
CN 201739336 U 2/2011

(Continued)

OTHER PUBLICATIONS

World Intellectual Property Organization (WIPO) International Search Report for PCT/CN2016/100265 dated Jun. 28, 2017 8 Pages.

Primary Examiner — Brian D Nash
(74) Attorney, Agent, or Firm — Anova Law Group, PLLC (57) ABSTRACT Video glasses include a headband body, a glasses body configured to rotate relative to the headband body to be at one of a plurality of positions including a use position and at least one open position, and a rotating shaft mechanism rotatably coupling the glasses body to the headband body. The glasses body is configured to be position limited at one of the at least one open position.

16 Claims, 5 Drawing Sheets

(56) References Cited

U.S. PATENT DOCUMENTS

| | | | | |
|---|---|---|---|---|
| 6,154,881 | A * | 12/2000 | Lee | A61F 9/045 2/9 |
| 7,120,939 | B1 * | 10/2006 | Howard | A42B 3/14 2/416 |
| 7,484,646 | B1 * | 2/2009 | Holmes | B63C 11/12 224/181 |
| 8,336,114 | B1 * | 12/2012 | Lee | A42B 3/145 2/9 |
| 8,990,963 | B2 * | 3/2015 | Matthews | A61F 9/061 2/8.2 |
| 8,994,610 | B2 * | 3/2015 | Tricoukes | H04R 1/105 345/8 |
| 9,635,450 | B2 * | 4/2017 | Drinkwater | G06F 1/1605 |
| D796,507 | S * | 9/2017 | Chen | D14/372 |
| 9,814,622 | B2 * | 11/2017 | Sommers | A42B 3/225 |
| 10,209,738 | B1 * | 2/2019 | Tompkins | G06F 1/163 |
| 2011/0127305 | A1 * | 6/2011 | Yates | G02B 7/002 224/181 |
| 2016/0249124 | A1 * | 8/2016 | Drinkwater | G06F 1/1605 |
| 2017/0367423 | A1 * | 12/2017 | Reitz | A42B 1/22 |
| 2018/0321707 | A1 * | 11/2018 | Hu | G02C 5/22 |
| 2019/0220057 | A1 * | 7/2019 | Yan | G06F 1/163 |
| 2019/0368656 | A1 * | 12/2019 | Xu | G06F 1/163 |

FOREIGN PATENT DOCUMENTS

| | | |
|---|---|---|
| CN | 104898281 A | 9/2015 |
| CN | 105158899 A | 12/2015 |
| CN | 205003363 U | 1/2016 |
| CN | 205173893 U | 4/2016 |
| CN | 205809417 U | 12/2016 |
| CN | 206074903 U | 4/2017 |
| CN | 206096631 U | 4/2017 |
| KR | 20140105319 A | 9/2014 |

* cited by examiner

VIDEO GLASSES

CROSS-REFERENCE TO RELATED APPLICATION

This application is a continuation of International Application No. PCT/CN2016/100265, filed on Sep. 27, 2016, the entire contents of which are incorporated herein by reference.

TECHNICAL FIELD

The present disclosure relates to the field of wearable devices and, more particularly, to video glasses.

BACKGROUND

A headband and a main body of conventional VR glasses are configured as an integral structure. As a user wears the VR glasses, a process of wearing and removing the VR glasses is tedious. When something unexpected happens in the environment, or when the user needs to know a status of an external world, or when the user needs to interact with the external world, or the like, the user cannot quickly remove the VR glasses, which reduces the user's experience comfort.

Further, a weight of the conventional VR glasses is heavy and concentrated on the main body of the VR glasses. A power supply of the VR glasses is provided from the external world. After the user wears the VR glasses, the weight of the VR glasses is applied to the user's head and face, and the comfort is poor with the VR glasses being worn. Further, a wide range of movement cannot be performed due to a limitation caused by the power supply.

SUMMARY

In accordance with the disclosure, there is provided video glasses including a headband body, a glasses body configured to rotate relative to the headband body to be at one of a plurality of positions including a use position and at least one open position, and a rotating shaft mechanism rotatably coupling the glasses body to the headband body. The glasses body is configured to be position limited at one of the at least one open position.

Reference numerals used in the drawings include: 10, glasses body; 11, main portion; 12 mask; 13, wire inlet hole; 20, headband body; 21, stationary seat; 211, mounting shaft; 22, mounting slot; 23, wire outlet hole; 24, housing; 25, battery pack; 26, earphone; 27, battery compartment; 30 rotating shaft mechanism; 301, pressure assembly; 302, connecting member; 303, connecting portion; 304, contact surface; 305, mounting portion; 306, wire passing slot; 307, positioning boss; 308, positioning slot; 31, abutment member; 311, positioning groove; 32, elastic component; 33, lock member; 34, elastic member; and 35, positioning pin.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

A virtual reality (VR) head-mounted display device is a device integrating a plurality of technologies such as a simulation technology, a computer graphics human-computer interface technology, a multimedia technology, a sensing technology, a network technology, and/or the like, which is a new means of human-computer interaction created by a computer technology and a latest sensor technology. Video glasses have become increasingly popular, and applications have become more widespread.

Figure 1:
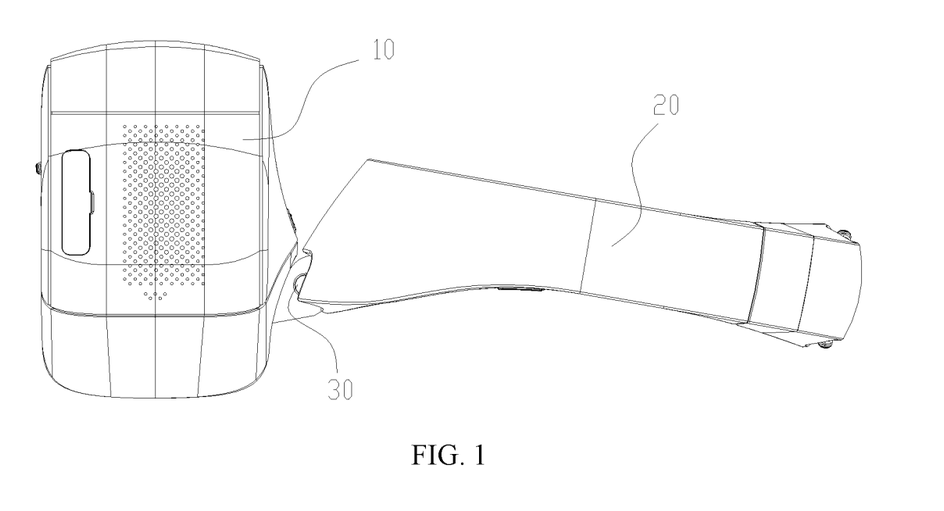
FIG. 1 is a schematic view of example video glasses in which a glasses body is rotated relative to a headband body and at an open position consistent with embodiments of the present disclosure.
Figure 2:
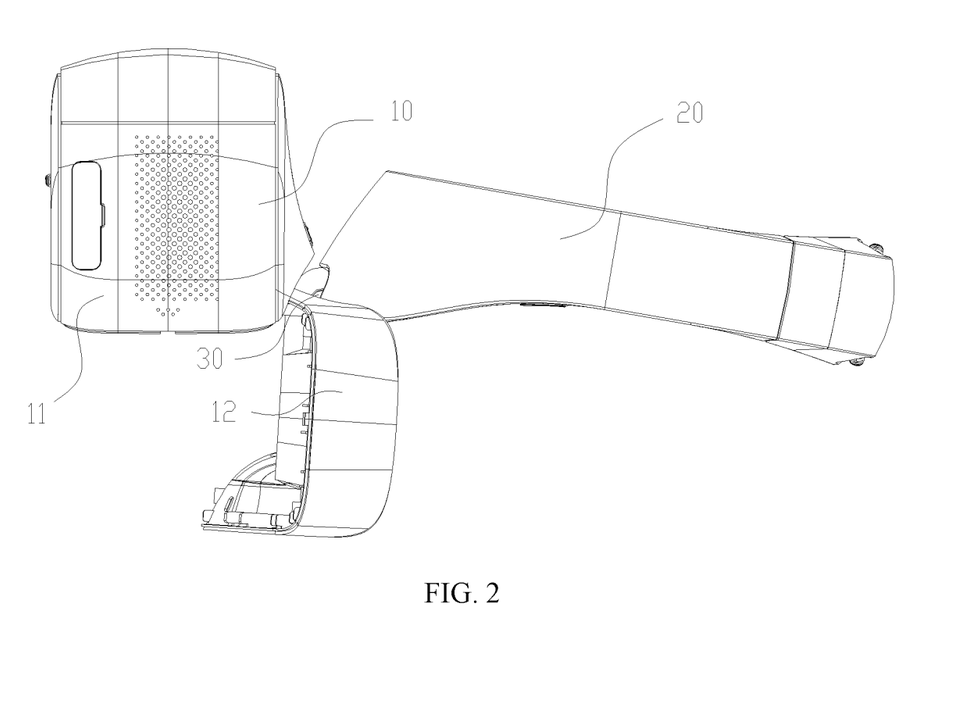
FIG. 2 is a schematic view of example video glasses in which a main portion is rotated relative to a headband body and at an open position consistent with embodiments of the present disclosure.

FIGS. 1 and 2 illustrate schematic views of example video glasses consistent with embodiments of the present disclosure. As shown in FIGS. 1 and 2, the video glasses include a glasses main body 10 (also referred to as a "glasses body" 10), a headband main body 20 (also referred to as a "headband body" 20), and a rotating shaft mechanism 30 that rotatably connects the glasses body 10 to the headband body 20. The glasses body 10 includes a space for accommodating a video glasses main part (not shown) and a mask 12. That is, the glasses body 10 includes a case, and the video glasses main part is arranged in the case. The glasses body 10 can rotate relative to the headband body 20 and at, e.g., a use position or one of at least one open position. In some embodiments, for example, the glasses body 10 may be position-limited at the at least one open position.

When a user wears the headband body 20, the glasses body 10 can be rotated relative to the headband body 20 around the rotating shaft mechanism 30, and the glasses body 10 can be stopped at one of the at least one open position or the use position of the headband body 20. When the user is using the video glasses, the glasses body 10 may be folded to, e.g., closed to, the use position. When the user needs to communicate with the external world, the glasses body 10 can be quickly opened, e.g., unfolded, and stop at an open position, such that the user can observe the external environment or perform timely communication or interaction with the external world. After the user ends the interaction, the glasses body 10 may be folded back to the use position, and the user can continue to use the video glasses. Without a need to remove the video glasses, the user can achieve the interaction with the external world, and continue to use the video glasses after the interaction ends, thereby making the operation convenient, and improving the user experience.

As shown in FIG. 2, in some embodiments, the glasses body 10 further includes a main portion 11 that matches the mask 12. In some embodiments, a rotation of the glasses body 10 relative to the headband body 20 includes a rotation of the main portion 11 relative to the headband body 20.

The glasses body 10 can be configured to be partially opened. That is, the rotating shaft mechanism 30 may connect the main portion 11 to the headband body 20, and the mask 12 may not participate in the rotation of the main portion 11 around the headband body 20. When the user is using the video glasses, the headband body 20 may be arranged over the user's head, the mask 12 may be attached to, e.g., fit to, the user's face, and the main portion 11 may be coupled to the headband body 20 through the rotating shaft mechanism 30.

When the user is using the video glasses, the rotating shaft mechanism 30 is at the use position, and the main portion 11 is attached to the mask 12. When the user needs to observe the external environment or interact with the external world, the main portion 11 may be opened and rotated around the rotating shaft mechanism 30 to an open position. The main portion 11 may stop at the open position, and the user can interact with the external world. The mask 12 may remain to fit, e.g., touch or close to, the user's face. The mask 12 may fit the user's face relatively well. After the main portion 11 is opened from and folded back again to the mask 12, the main portion 11 can maintain a coupling position with the mask 12 and data such as a view angle adjusted according to the user. Thus, the user can quickly continue to use the video glasses without re-adjusting, thereby ensuring a good user experience.

As shown in FIG. 1, in some embodiments, the glasses body 10 further includes a main portion 11 that matches the mask 12, and a rotation of the glasses body 10 relative to the headband body 20 includes a rotation of the main portion 11 and the mask 12 together relative to the headband body 20.

The glasses body 10 can be configured to be integrally opened. That is, the rotating shaft mechanism 30 may connect the glasses body 10 to the headband body 20, and the main portion 11 and the mask 12 may be fixed to each other and rotate together around the headband body 20. When the user is using the video glasses, the headband body 20 may be mounted to the user's head, the rotating shaft mechanism 30 may be at the use position, and the mask 12 may fit the user's face. When the user needs to observe the external environment or communicate/interact with the external world, the glasses body 10 may be opened and rotated around the rotating shaft mechanism 30 to an open position. The main portion 11 and the mask 12 may stop at the open position, and the user can communicate or interact with the external world. The integral opening of the glasses body 10 may allow the user to observe the environment relatively conveniently, and communicate with the external world, with the face being uncovered.

Figure 4:
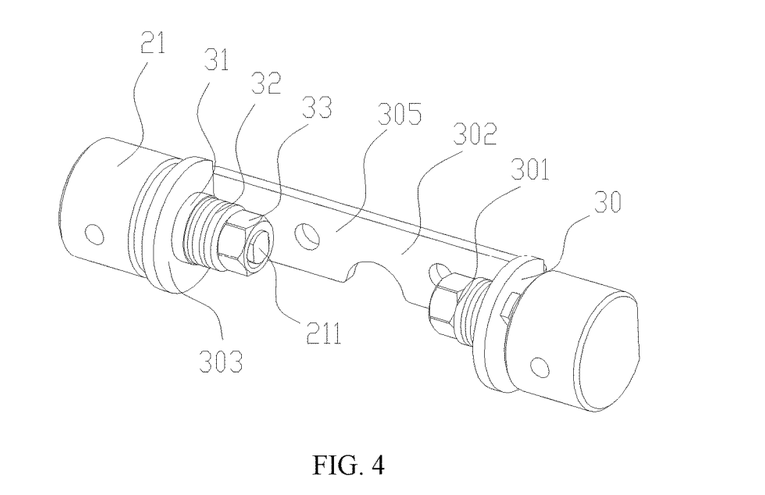
FIG. 4 is a schematic three-dimensional structure diagram of an example rotating shaft mechanism in example video glasses consistent with embodiments of the present disclosure.
Figure 7:
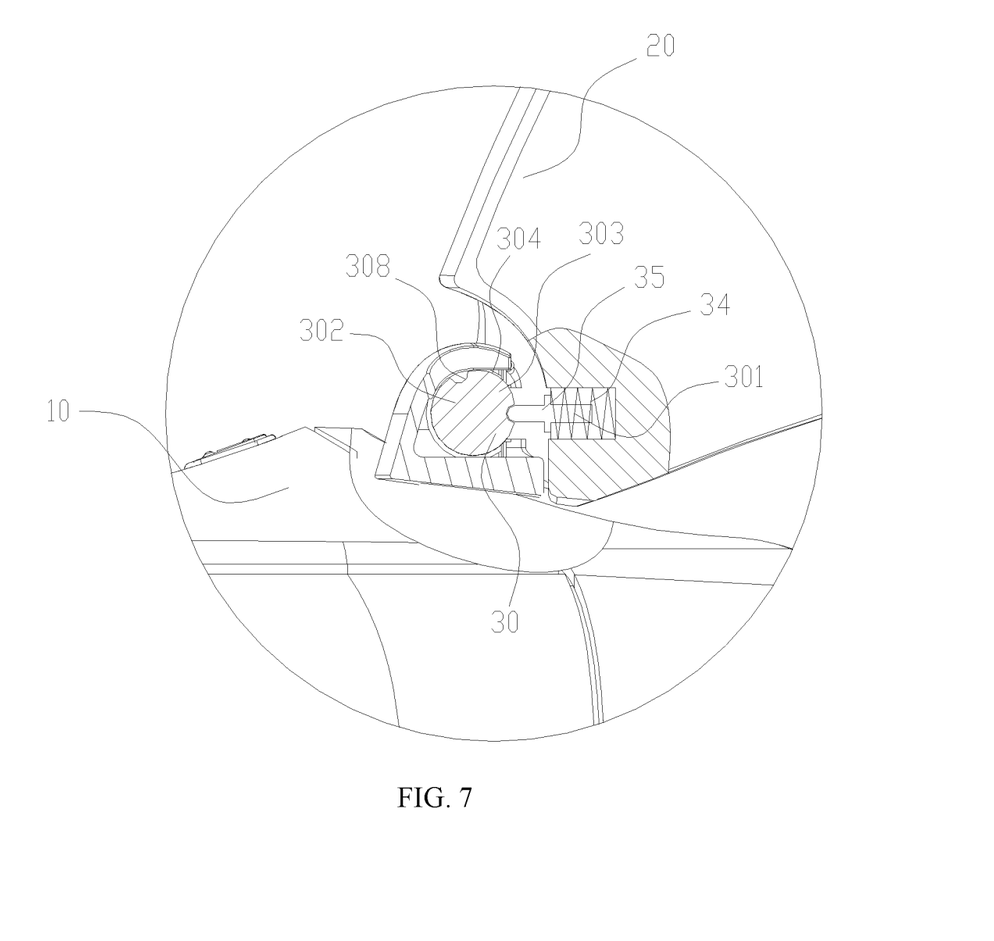
FIG. 7 is a partial enlarged view of another example rotating shaft mechanism in example video glasses consistent with embodiments of the present disclosure.

Referring to FIG. 4 and FIG. 7, in some embodiments, the rotating shaft mechanism 30 includes a pressure assembly 301 and a connecting member 302, and the connecting member 302 includes a connecting portion 303 that can rotate relative to the pressure assembly 301. The rotating shaft mechanism 30 are coupled to the headband body 20 and the glasses body 10, such that a damping force generated by a rotation of the connecting portion 303 relative to the pressure assembly 301 may be greater than a gravity of the glasses body 10.

The headband body 20 and the glasses body 10 may be coupled to each other through the rotating shaft mechanism 30 to form a whole body. In some embodiments, the pressure assembly 301 may be mounted to the headband body 20, and the connecting member 302 may be mounted to the glasses body 10. In some other embodiments, the pressure assembly 301 may be mounted to the glasses body 10, and the connecting member 302 may be mounted to the headband body 20. These variations can be flexibly set as needed.

A damping force may exist between the pressure assembly 301 and the connection portion 303. In the scenarios that the damping force is greater than the gravity of the glasses body 10, a rotation of the connecting member 302 can cause the glasses body 10 to stay at any open position with respect to the headband body 20. When the rotating shaft mechanism 30 is connected to the main portion 11 of the glasses body 10, and in the scenarios that the damping force is greater than the gravity of the glasses body 10 or only greater than a gravity of the main portion 11, a rotation of the connecting member 302 can cause the main portion 11 to stay at any open position with respect to the headband body 20. The glasses body 10 may be conveniently opened, and opening comfort can be flexibly set by adjusting the damping force.

Figure 3:
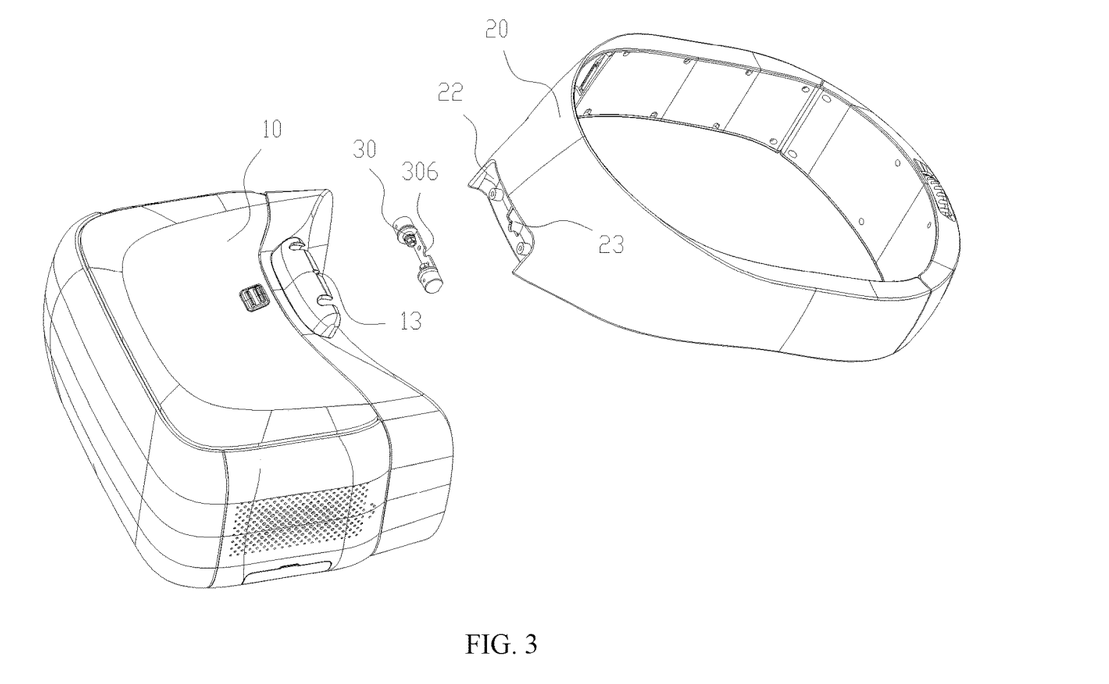
FIG. 3 is a schematic exploded view of example video glasses consistent with embodiments of the present disclosure.

As shown in FIG. 3, in some embodiments, the pressure assembly 301 is mounted to the headband body 20, and the connecting member 302 is mounted to the glasses body 10.

Figure 5:
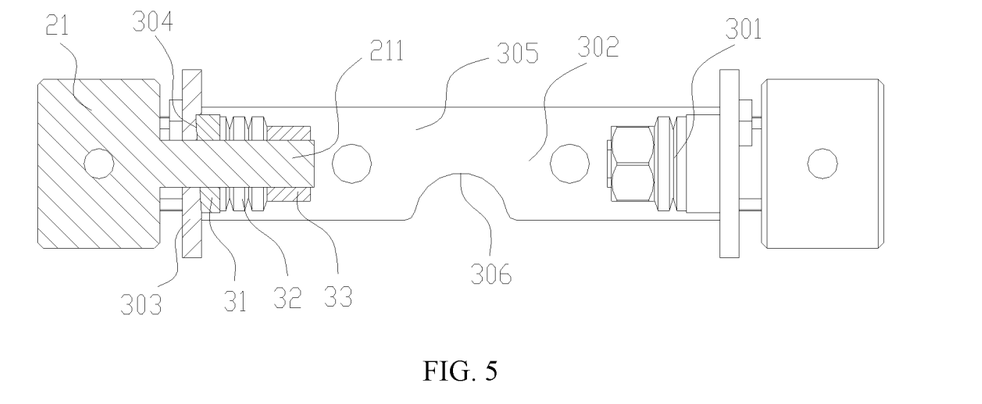
FIG. 5 is a partial cross-sectional view of an example rotating shaft mechanism in example video glasses consistent with embodiments of the present disclosure.
Figure 6:
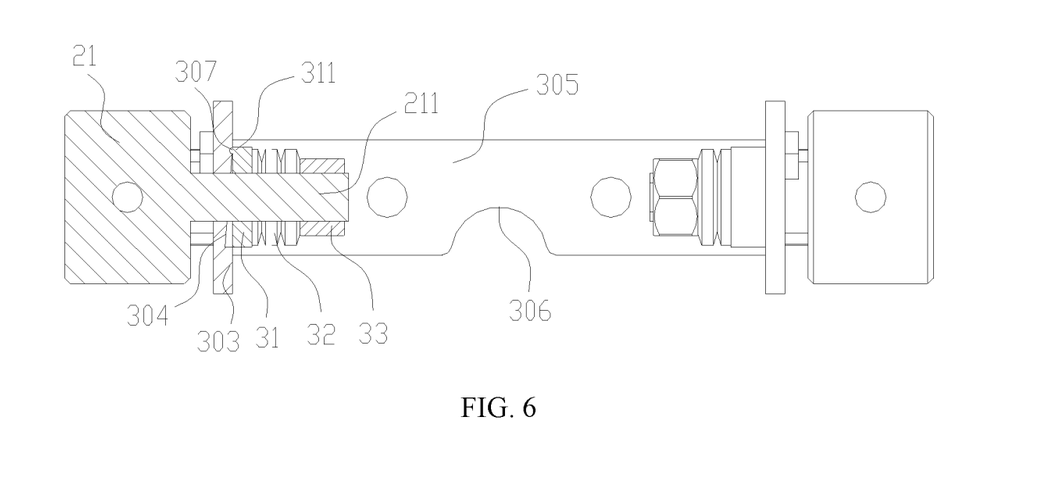
FIG. 6 is another partial cross-sectional view of an example rotating shaft mechanism in example video glasses that is rotated to a limit position consistent with embodiments of the present disclosure.

As shown in FIGS. 4 to 6, the pressure assembly 301 includes a stationary seat 21, and the stationary seat 21 is mounted to the headband body 20. The stationary seat 21 includes a mounting shaft 211. The pressure assembly 301 further includes an abutment member 31 and a lock member 33 arranged at the mounting shaft 211, and an elastic component 32 arranged between the abutment member 31 and the lock member 33. The connecting member 302 is fixed with respect to the pressure assembly 301 under an abutment of the abutment member 31.

The stationary seat 21 is fixed at the headband body 20, and the mounting shaft 211 is protruded from the stationary seat 21. A cross-sectional area of the mounting shaft 211 is smaller than, e.g., within, a cross-sectional area of the stationary seat 21. For example, a diameter of the mounting shaft 211 is smaller than a diameter of the stationary seat 21. The connecting member 302, the abutment member 31, the elastic component 32, and the lock member 33 are mounted to the mounting shaft 211. The lock member 33 is fixed at the mounting shaft 211. One end of the elastic component 32 abuts against the lock member 33, and the other end of the elastic component 32 abuts against the abutment member 31. A preloaded pressure of the elastic component 32 pushes the abutment member 31 to abut against the connecting member 302.

By adjusting a position of the lock member 33 at the mounting shaft 211, the preloaded pressure of the elastic component 32 can be adjusted, such that a damping force between the abutment member 31 and the connecting member 302 can be adjusted. The lock member 33 may include a fastener, such as a nut or the like. The connecting member 302 can rotate around an axis of the mounting shaft 211. The abutting member 31 may abut against the connecting member 302 by a preloaded pressure of the elastic component 32, and the connecting member 302 may abut against the stationary seat 21. The damping force between the connecting member 302 and the abutment member 31 may be greater than a gravity of the connecting member 302, such that the connecting member 302 can be fixed with respect to the abutment member 31. In some embodiments, a damping force between the connecting member 302 and the pressure assembly 301 may be implemented by arranging other elastic structure such as a sheet spring between the pressure member 301 and the connecting portion 303. In some other embodiments, a damping force between the connecting member 302 and the pressure assembly 301 may be implemented by using the pressure assembly 301 to apply certain preloaded pressure to the connecting member 302.

The connecting member 302 further includes a mounting portion 305, and the connecting portion 303 is coupled to the mounting portion 305. The mounting portion 305 is fixed to the glasses body 10. The connecting portion 303 is arranged over the mounting shaft 211 and between the abutment member 31 and the stationary seat 21, and is abutted by the abutment member 31.

The connecting portion 303 is arranged between the abutment member 31 and the stationary seat 21, and a rotation direction of the connecting portion 303 is perpendicular to an axis of the mounting shaft 211, e.g., the connecting portion 303 can rotate about an axis parallel to the axis of the mounting shaft 211. The mounting portion 305 is attached to the connecting portion 303 to facilitate a coupling between the glasses body 10 and the connecting member 302. Further, various connection manners may be enabled. For example, the mounting portion 305 may protrude from and be perpendicular to the connecting portion 303. The glasses body 10 may be fixed to the mounting portion 305, and the connecting portion 303 may be arranged at a center of the glasses body 10. As another example, the connecting portion 303 may be arranged at two ends of the mounting portion 305, and the connecting portions 303 may be symmetrically mounted to the mounting shafts 211. At least one pressure assembly 301 may abut against the connecting portion 303, and an adjustment range of the damping force may be relatively wide.

In some embodiments, a contact surface 304 of the connecting portion 303 for contacting the abutment member 31 may include a plane. The pressure assembly 301 may apply an elastic force to the contact surface 304 of the connecting portion 303, such that the connecting member 302 can be fixed with respect to the pressure assembly 301 when the connecting member 302 is not being operated.

The contact surface 304 of the connecting portion 303 for contacting the abutment member 31 may include a plane. An elastic force of the pressure assembly 301 applied on the connecting member 302 may result in, e.g., generate, a damping force at the contact surface 304 of the connecting portion 303 with respect to the abutment member 31. During rotation, the damping force may not change. When the damping force is greater than a gravity of the glasses body 10 and no external force is applied to the glasses body 10, the connecting member 302 may be fixed with respect to the pressure assembly 301. That is, the glasses body 10 may stay in any open position. The damping force can be adjusted by adjusting the elastic force of the pressure assembly 301, and/or by adjusting a roughness of the contact surface 304, such that the open position of the glasses body 10 can be adjusted relatively conveniently.

As shown in FIGS. 5 and 6, in some other embodiments, the contact surface 304 of the connecting portion 303 for contacting the abutment member 31 includes an inclined surface. As the connecting member 302 rotates relative to the pressure assembly 301, the abutment member 31 may interact with the inclined surface, such that the damping force of the abutment member 31 on the connecting portion 303 may increase or decrease.

Both the connecting portion 303 and the abutment member 31 may rotate around the mounting shaft 211. When the contact surface 304 of the connection portion 303 for contacting the abutment member 31 includes an inclined surface, the connecting portion 303 may rotate with respect to the abutment member 31, such that the inclined surface 304 between the connection portion 303 and the abutment member 31 may be misplaced. When the contact surface 304 of the connecting portion 303 for contacting the abutment member 31 overlaps with, e.g., the abutment member 31, a total width of the connecting portion 303 and the abutment member 31 may have a smallest value. As the contact surface 304 of the connecting portion 303 for contacting the abutment member 31 is gradually misplaced from overlapping, the total width of the connecting portion 303 and the abutment member 31 may gradually increase until a most protruding part of the abutment member 31 abuts against a top end of the contact surface 304 of the connecting portion 303, at which the total width of the connecting portion 303 and the abutment member 31 has a largest value. As the total width between the connection portion 303 and the abutment member 31 gradually increases, the abutment member 31 may compress the elastic component 32, and the elastic force applied to the connecting portion 303 may increase. As the total width between the connecting portion 303 and the abutment member 31 gradually decreases, the elastic force applied to the connecting portion 303 by the abutment member 31 compressing the elastic component 32 may gradually decrease.

By configuring the contact surface 304 as an inclined surface, as the glasses body 10 is opened, the force applied to the glasses body 10 may gradually increase until the glasses body 10 stops at an open position. As another example, the force applied to the glasses body 10 may be configured to, while the glasses body 10 is being opened, gradually decrease until the glasses body 10 stops at an open position. When the glasses body 10 is being folded to the use position, a force applied to the glasses body 10 is opposite to the force during the process of opening the glasses body 10. By configuring an adjustment direction of the damping force, the user experience during the glasses body 10 being unfolded or folded may be enriched.

Further, as the glasses body 10 rotates relative to the headband body 20 from the use position to at least one open position, the inclined surface of the contact surface 304 also rotates, such that the damping force of the abutment member 31 applied to the connecting portion 303 may decrease. That is, during the process of opening the eyeglasses body 10, the contact surfaces 304 of the connecting portion 303 and the abutment member 31 can gradually overlap, to reduce the total width of the connecting portion 303 and the abutment member 31, which reduces the elastic force and hence reduces the damping force.

Because the video glasses are mounted to the user's head, a reduced damping force during the process of opening the glasses body 10 may make it relatively easy to open the glasses body 10, and prevent the headband body 20 from being taken away from the head. Correspondingly, during the glasses body 10 being folded to the use position, the damping force on the glasses body 10 may gradually increase, and the glasses body 10 can be slowly moved to the user's use position. The position of the glasses body 10 may be relatively fixed and may not be easy to loosen. During use, a position of the glasses body 10 may be relatively stable.

As shown in FIG. 6, in some embodiments, the abutment member 31 includes a positioning boss 307, and the contact surface 304 includes a positioning groove 311. As the glasses body 10 rotates relative to the headband body 20 to at least one open position, the positioning boss 307 may match the positioning groove 311 to cause the glasses body 10 to stay at the open position.

The positioning boss 307 may be arranged at the abutment member 31, and may rotate and match the positioning groove 311 at the contact surface 304, such that the glasses body 10 may be held at a configured open position. Further, a certain force may need to be applied to the glasses body 10 to remove the positioning boss 307 from the positioning groove 311, thereby preventing the user's shaking or other swinging behavior from causing the glasses body 10 to rotate and keeping the open position of the glasses body 10 stable. Further, a plurality of positioning grooves 311 may be arranged at the contact surface 304 to match different open positions.

FIG. 7 is a partial enlarged view of another example rotating shaft mechanism in example video glasses consistent with embodiments of the present disclosure. As shown in FIG. 7, in some embodiments, a rotating shaft mechanism 30 includes a positioning pin 35 installed in the headband body 20 and an elastic member 34 abutting against the positioning pin 35. A connecting portion 303 includes a positioning slot 308 that engage with the positioning pin 35.

One end of the elastic member 34 abuts in the headband body 20, and the other end of the elastic member 34 abuts against the positioning pin 35. The positioning pin 35 has a preloaded force on the elastic member 34, and the other end of the positioning pin 35 abuts against the connecting portion 303. As the connecting portion 303 rotates, the positioning pin 35 may slide along a contact surface 304 of the connecting portion 303 and generate a damping force. When the damping force is greater than a gravity of the glasses body 10, the glasses body 10 may stop at any position where the rotating shaft mechanism 30 rotates. A positioning slot 308 may be arranged at the connecting portion 303. When the connecting portion 303 is rotated to a position where the positioning pin 35 is inserted into the positioning slot 308, the glasses body 10 can be held in a corresponding open position of the positioning slot 308. The configuration of the positioning slot 308 may allow the damping force of the positioning pin 35 on the connection portion 303 to be smaller than the gravity of the glasses body 10, and the glasses body 10 can be fixed in the set open position.

In some embodiments, the connecting portion 303 may include a cam plate. That is, the contact surface 304 of the connecting portion 303 for contacting the positioning pin 35 may include a cam surface, and the positioning slot 308 may be arranged at a low point of the cam plate. When the glasses body 10 is at a use position with respect to the headband body 20, the positioning pin 35 may be at a high or highest point of the cam plate. When the glasses body 10 is at the at least one open position with respect to the headband body 20, the positioning pin 35 may match the positioning slot 308.

A plurality of positioning slots 308 may be arranged corresponding to different open positions. A positioning slot 308 may be arranged at a low point of the cam plate. That is, the positioning pin 35 may be at a side of the cam plate where the cam radius is relatively small. Thus, at the open position, an elastic force between the positioning pin 35 and the connecting portion 303 may be relatively small, and the damping force applied to the connecting portion 303 may be relatively small. When the glasses body 10 is at a use position with respect to the headband body 20, the positioning pin 35 may be at a high or highest point of the cam plate. That is, the positioning pin 35 may be at a side of the cam plate where the cam radius is relatively large. Thus, at the use position, the elastic force between the positioning pin 35 and the connecting portion 303 may be relatively large. As the glasses body 10 is unfolded from the use position to at least one open position, the damping force applied to the glasses body 10 may be gradually reduced. As the glasses body 10 is folded from at least one open position to the use position, the damping force applied to the glasses body 10 may be gradually increased. Because the video glasses are mounted to the user's head, a reduced damping force during the process of opening the glasses body 10 may make the opening of the glasses body 10 relatively easy, and may prevent the headband body 20 from being taken away from the head.

In some embodiments, the connecting portion 303 may include a flange plate. The connecting portion 303 may include a flange plate that is attached to the connecting member 302. The connecting member 302 may have an axial shape, a flat plate shape perpendicular to the flange plate, or the like. The connecting portion 303 arranged at the connecting member 302 may press the pressure assembly 301 and be pressed by the pressure assembly 301 to generate a damping force that slows down a rotation of the glasses body 10. Various shapes may be chosen for the connecting member 302 according to actual needs.

Figure 8:
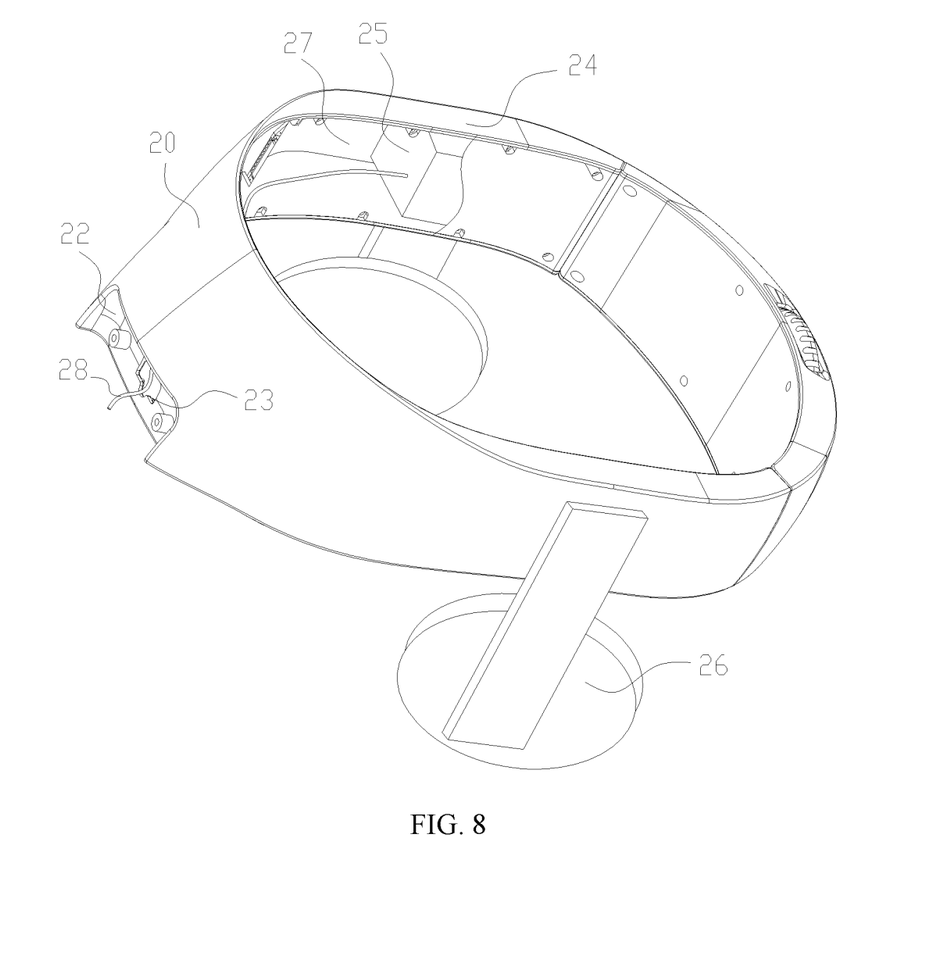
FIG. 8 is a schematic partial cross-sectional view of example video glasses consistent with embodiments of the present disclosure.

As shown in FIG. 8, in some embodiments, the headband body 20 includes a housing 24 and a battery pack 25, and two sides of the housing 24 symmetrically include battery compartments 27. The battery pack 25 is arranged in the battery compartment 27. A wire is connected to the battery pack 25. The wire can be coupled to the video glasses main part.

The battery compartment 27 arranged in the headband body 20 for mounting the battery pack 25 can provide the video glasses with their own power supply, thereby prevent the movement range from being limited by an external power supply. By using the built-in battery pack 25, conducting wires, a smart control portion of the video glasses main part, charge/discharge socket portions of the battery pack 25 may form a complete charge and discharge system.

In some embodiments, the battery pack 25 and the glasses body 10 may be arranged separately at two sides of the headband body 20. The battery pack 25 may be arranged at rear of the headband body 20, such that the battery pack 25 and the glasses body 10 can be arranged at two sides of the headband body 20 to balance weight distribution of the video glasses over the user's head and improve wear comfort of the video glasses.

As shown in FIG. 8, in some embodiments, the headband body 20 further includes an earphone 26, the earphone 26 includes a signal line, and the signal line is coupled to the video glasses main part. An earphone 26 may be arranged at the headband body 20. A signal source may be coupled to the video glasses main part, and further an audio signal may be transmitted to the earphone 26, such that a signal source of the earphone 26 can come from the video glasses. Accordingly, the video glasses may not need to be coupled to an external earphone or an external signal source.

As shown in FIG. 8, in some embodiments, a mounting slot 22 is arranged at the headband body 20, the rotating shaft mechanism 30 is arranged in the mounting slot 22, and a wire outlet hole 23 is arranged in the mounting slot 22. A wire passing slot 306 may be arranged at the rotating shaft mechanism 30, e.g., as shown in FIG. 6. A wire inlet hole 13 may be arranged at the glasses body 10. Wires may pass through a wire outlet hole 23, pass along the wire passing slot 306, and pass through the wire inlet hole 13. By arranging the battery pack 25 in the headband body 20, an internal power supply may be provided to the glasses body 10. A wire outlet hole 23 may be arranged in the headband body 20 for an interleaved layout of wires in the headband body 20. In some embodiments, a wire passing slot 306 may be arranged at the rotating shaft mechanism 30 to prevent the wires that pass through the rotating shaft mechanism 30 from being broken by the rotating shaft mechanism 30.

The headband body 20 and the glasses body 10 may be coupled to each other through a plug connection. An plug connection portion may be arranged at the headband body 20. The plug connection portion may include a plug or a socket, and the wires may be extended to the plug connection portion.

The present disclosure provides video glasses. The video glasses may include a glasses body, a headband body, and a rotating shaft mechanism for rotatably coupling the glasses body to the headband body. The glasses body may rotate relative to the headband body and include a use position and at least one open position. A stop position of the glasses body may be at at least one open position. In the present disclosure, a rotating shaft mechanism may cause the glasses body to rotate relative to the headband body, and the glasses body may fit a user's face in the use position. When the user needs to observe an external environment, the glasses body can rotate to realize an interaction between the user and an external world. Accordingly, user experience can be improved.

In the present disclosure, the disclosed embodiments and the features of the disclosed embodiments may be combined when there are no conflicts.

The relational term such as "first," "second," or the like is merely used to distinguish one entity or operation from another entity or operation, without necessarily requiring or implying that these entities or operations should have any of actual relation or sequence. Further, the term "comprising," "containing," "including" or the like is intended to cover a non-exclusive inclusion, such that a process, method, article, or apparatus not only may include those elements explicitly listed, but also may include other elements not explicitly listed and/or inherent elements of such process, method, article, or apparatus without more constraints, the element defined by the wording "include an . . . " or similar expression does not exclude the existence of additional identical element(s) in a process, method, article, or apparatus that includes the element.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A head-mount device comprising:
a headband body;
a glasses body configured to rotate relative to the headband body among a plurality of positions including a use position and at least one open position, the glasses body being configured to be position limited at one of the at least one open position, and the glasses body including a mask configured to be fit to a user's face and a main portion configured to match the mask, the main portion being configured to rotate relative to the headband body while the mask remains stationary with respect to the headband body; and
a rotating shaft mechanism rotatably coupling the glasses body to the headband body.

2. The head-mount device according to claim 1, wherein:
the rotating shaft mechanism is coupled to the headband body and the glass body, and includes:
a pressure assembly; and
a connecting member including a connecting portion configured to rotate relative to the pressure assembly; and
a damping force generated by a rotation of the connecting portion relative to the pressure assembly is greater than a gravity of the glasses body.

3. The head-mount device according to claim 2, wherein:
the pressure assembly is mounted to the headband body; and
the connecting member is mounted to the glasses body.

4. The head-mount device according to claim 3, wherein:
the pressure assembly includes:
a stationary seat mounted to the headband body and including a mounting shaft;
an abutment member and a lock member arranged at the mounting shaft; and
an elastic component arranged between the abutment member and the lock member, and
the connecting member is fixed with respect to the pressure assembly under an abutment by the abutment member.

5. The head-mount device according to claim 4, wherein:
the connecting member includes a mounting portion securely attached to the glasses body, the connecting portion being attached to the mounting portion; and
the connecting portion is arranged at the mounting shaft and between the abutment member and the stationary seat, and is abutted by the abutment member.

6. The head-mount device according to claim 5, wherein:
a contact surface of the connecting portion for contacting the abutment member includes a plane; and
the pressure assembly is configured to apply an elastic force to the contact surface of the connecting portion, to cause the connecting member to be fixed with respect to the pressure assembly when the connecting member is not being operated.

7. The head-mount device according to claim 5, wherein:
a contact surface of the connecting portion for contacting the abutment member includes an inclined surface; and
the abutment member is configured to interact with the inclined surface when the connecting member rotates relative to the pressure assembly, to change a damping force applied by the abutment member to the connecting portion.

8. The head-mount device according to claim 7, wherein:
the inclined surface of the contact surface is configured to increase when the glasses body rotates relative to the headband body from the use position to the one of the at least one open position, to decrease the damping force applied by the abutment member to the connecting portion.

9. The head-mount device according to claim 8, wherein:
the abutment member includes a positioning boss;
the contact surface includes a positioning groove; and
the positioning boss is configured to match the positioning groove when the glasses body rotates relative to the headband body to the one of the at least one open position, to cause the glasses body to be fixed at the one of the at least one open position.

10. The head-mount device according to claim 2, wherein:
the rotating shaft mechanism includes a positioning pin in the headband body and an elastic member abutting against the positioning pin; and
the connecting portion includes a positioning slot that matches the positioning pin.

11. The head-mount device according to claim 10, wherein:
the connecting portion includes a cam plate;
the positioning slot is arranged at a low point of the cam plate;
when the glasses body is at the use position with respect to the headband body, the positioning pin is at a high or highest point of the cam plate; and
when the glasses body is at the one of the at least one open position with respect to the headband body, the positioning pin matches the positioning slot.

12. The head-mount device according to claim 1, wherein:
the rotating shaft mechanism is coupled to the headband body and the glasses body, and includes:
a pressure assembly; and
a connecting member including a connecting portion, the connecting portion including a flange plate and being configured to rotate relative to the pressure assembly; and
a damping force generated by a rotation of the connecting portion relative to the pressure assembly is greater than a gravity of the glasses body.

13. The head-mount device according to claim 12, wherein:
the pressure assembly is mounted to the headband body; and
the connecting member is mounted to the glasses body.

14. The head-mount device according to claim 13, wherein:
the pressure assembly includes:
a stationary seat mounted to the headband body and including a mounting shaft;
an abutment member and a lock member arranged at the mounting shaft; and
an elastic member arranged between the abutment member and the lock member; and
the connecting member is fixed with respect to the pressure assembly by an abutment of the abutment member.

15. The head-mount device according to claim 14, wherein:
the connecting member includes a mounting portion securely attached to the glasses body, the connecting portion being attached to the mounting portion; and
the connecting portion is arranged at the mounting shaft and between the abutment member and the stationary seat, and is abutted by the abutment member.

16. The head-mount device according to claim 15, wherein:
a contact surface of the connecting portion and the abutment member includes a plane; and
the pressure assembly is configured to apply an elastic force to the contact surface of the connecting portion, to cause the connecting member to be fixed with respect to the pressure assembly when the connecting member is not being operated.

* * * * *